(12) United States Patent
Hsiao et al.

(10) Patent No.: US 11,061,501 B2
(45) Date of Patent: Jul. 13, 2021

(54) TOUCH PANEL AND MANUFACTURING METHOD THEREOF

(71) Applicant: Cambrios Film Solutions Corporation, Tortola (VG)

(72) Inventors: Chung-Chin Hsiao, Hsinchu County (TW); Siou-Cheng Lien, Miaoli County (TW); Cheng-Yuan Hsu, Taoyuan (TW); Jen-Yu Yew, Chiayi County (TW); Kang-Yu Liu, Hsinchu County (TW); Wei-Na Cao, Fujian (CN)

(73) Assignee: Cambrios Film Solutions Corporation, Tortola (VG)

( * ) Notice: Subject to any disclaimer, the term of this patent is extended or adjusted under 35 U.S.C. 154(b) by 0 days.

(21) Appl. No.: 16/674,273

(22) Filed: Nov. 5, 2019

(65) Prior Publication Data

US 2020/0301557 A1 Sep. 24, 2020

(30) Foreign Application Priority Data

Mar. 22, 2019 (CN) .......................... 201910223160.5

(51) Int. Cl.
*G06F 3/041* (2006.01)
*G06F 3/047* (2006.01)
(52) U.S. Cl.
CPC .......... *G06F 3/04142* (2019.05); *G06F 3/047* (2013.01)

(58) Field of Classification Search
CPC ............... G06F 3/041–048; G06F 2203/04103
See application file for complete search history.

(56) References Cited

U.S. PATENT DOCUMENTS

| 2014/0240620 | A1* | 8/2014 | Chiu ..................... G06F 1/1626 349/12 |
| 2016/0320876 | A1* | 11/2016 | Son ..................... G06F 3/04164 |
| 2016/0349883 | A1* | 12/2016 | Kiyoto .................. G06F 3/0446 |
| 2021/0041986 | A1* | 2/2021 | Hsiao .................... G06F 3/0445 |

* cited by examiner

*Primary Examiner* — Roy P Rabindranath
(74) *Attorney, Agent, or Firm* — Cooper Legal Group, LLC

(57) ABSTRACT

A touch panel includes a substrate, first and second touch sensing electrodes, and first and second traces. The substrate includes a display area and a peripheral area. The first and second touch sensing electrodes are formed on the display area, and the first and second traces are formed on the peripheral area. The first touch sensing electrode is formed by a first portion of a metal nanowire layer, which is patterned. The peripheral trace includes a conductive layer and a second portion of the metal nanowire layer, both of which are patterned in a co-etch step. The conductive layer and the second portion of the metal nanowire layer have a coplanar etched surface. The second touch sensing electrode is formed on an insulating layer and connects with the second trace.

20 Claims, 14 Drawing Sheets

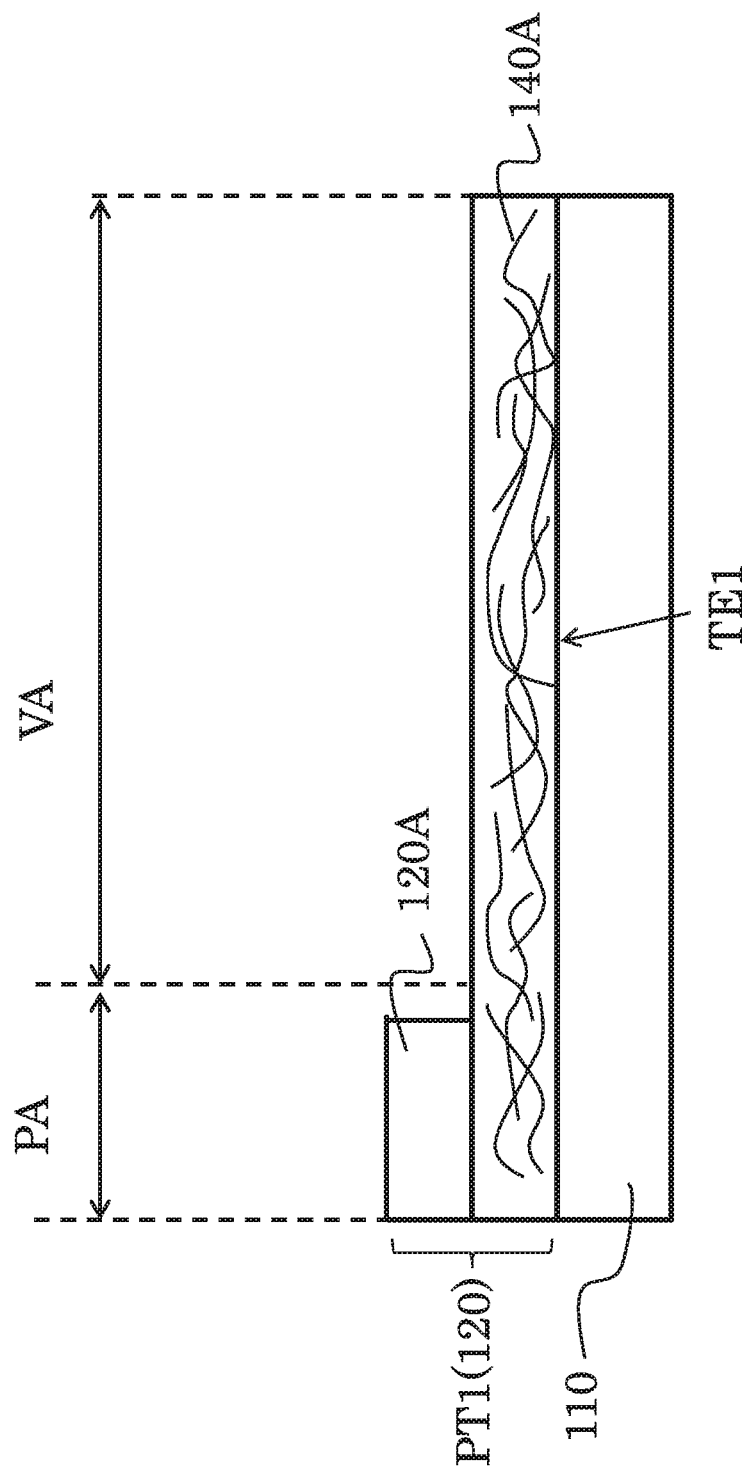

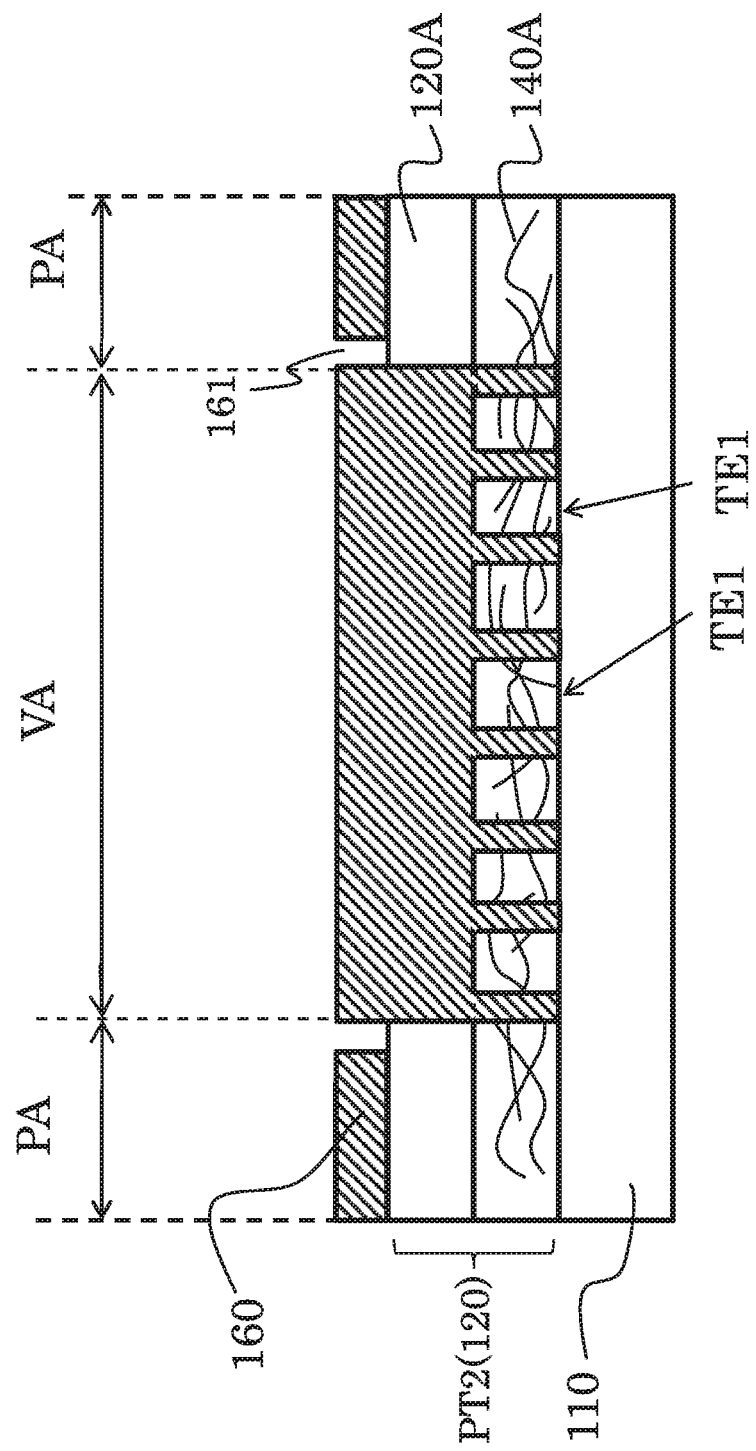

TOUCH PANEL AND MANUFACTURING METHOD THEREOF

CROSS-REFERENCE TO RELATED APPLICATION

This application claims priority to China Application Serial Number 201910223160.5, filed Mar. 22, 2019, which is herein incorporated by reference.

BACKGROUND

Technology Field

This disclosure relates to a touch panel and a manufacturing method thereof.

Description of Related Art

Transparent conductive materials, which have good light transmission and electrical conductivity, are generally applied to devices related to display panels or touch panels. Transparent conductive materials include metal oxides, such as indium tin oxide (ITO), indium zinc oxide (IZO), cadmium tin oxide (CTO) or aluminum-doped zinc oxide (AZO). However, certain properties of these metal oxide films have been challenged, such as insufficient flexibility. In some cases, patterning of the metal oxide film may also be readily visible to the user. Therefore, various transparent conductive materials, including metal nanowires, are being developed currently.

The nanowires are often patterned to form sensor electrodes, and connected to metal traces in a peripheral area of the device that encircles the viewing area. Typically, alignment space is reserved when the bonding process is performed. The additional space requirement for the alignment trades off against the requirement for a narrow border.

Integration of touch sensing products made with nanowires with other optical components is also a focus of research and development.

To achieve better performance when using the nanowires to manufacture the touch sensing electrodes, the associated manufacturing processes and the electrode structures are customized to the material characteristics.

SUMMARY

In some embodiments of the present disclosure, a method for manufacturing a touch panel is proposed, which has the advantages of high manufacturing efficiency, lower circuit impedance, and good optical and electrical characteristics of the display area.

A touch panel includes a display area and a peripheral area. The touch panel further includes: a substrate; a first touch sensing electrode, a first peripheral trace, a second peripheral trace, an insulating layer, and a second touch sensing electrode. The first touch sensing electrode is disposed on a first surface of the substrate and located in the display area, wherein the first touch sensing electrode includes a first portion of a first metal nanowire layer, which is patterned. The first peripheral trace and the second peripheral trace are disposed on the first surface of the substrate and located in the peripheral area. The first peripheral trace is electrically connected to the first touch sensing electrode. The first peripheral trace and the second peripheral trace include a conductive layer and a second portion of the first metal nanowire layer. The conductive layer and the second portion of the first metal nanowire layer have a co-etched surface. The insulating layer covers the first touch sensing electrode and the second peripheral trace and includes a conductive via disposed corresponding to the second peripheral trace. The second touch sensing electrode is disposed on the insulating layer and includes a second metal nanowire layer, which is patterned. The second touch sensing electrode is electrically connected to the second peripheral trace through the conductive via.

In some embodiments, the second portion of the first metal nanowire layer is formed on the first surface of the substrate, and the conductive layer is formed on the second portion of the metal nanowire layer, or the conductive layer is formed on the first surface of the substrate, and the second portion of the first metal nanowire layer is formed on an upper surface of the conductive layer.

In some embodiments of the present disclosure, the touch panel further includes an overcoat layer disposed on the first metal nanowire layer and/or the second metal nanowire layer.

In some embodiments of the present disclosure, the touch panel has a pair of the second peripheral traces, the insulating layer includes a pair of the conductive vias corresponding to the pair of second peripheral traces, the second touch sensing electrode is electrically connected to the pair of the second peripheral traces through the pair of the conductive vias, and forms a bridge structure on the insulating layer.

In some embodiments of the present disclosure, the touch panel further includes a liquid crystal material layer formed on a second surface of the substrate, wherein the second surface is opposite to the first surface.

In some embodiments of the present disclosure, the liquid crystal material layer includes a polarized liquid crystal layer and/or a phase difference liquid crystal layer.

Some embodiments of the present disclosure provide a manufacturing method of a touch panel. The method includes the following steps. A first metal nanowire layer comprising metal nanowires is made on a first surface of a substrate. A conductive layer is made on the first metal nanowire layer. A first patterning step is performed, and includes patterning the first metal nanowire layer located in the display area, and simultaneously patterning the conductive layer and the first metal nanowire layer in the peripheral area to form a first peripheral trace and a second peripheral trace. The conductive layer located in the display area is removed to expose a first touch sensing electrode formed by patterning the first metal nanowire layer. An insulating layer is made to cover the first touch sensing electrode and the second peripheral trace, wherein the insulating layer includes a conductive via disposed corresponding to the second peripheral trace. A second touch sensing electrode is made on the insulating layer, wherein the second touch sensing electrode is electrically connected to the second peripheral trace through the conductive via.

In some embodiments of the present disclosure, making the second touch sensing electrode on the insulating layer includes: making a second metal nanowire layer comprising metal nanowires on the insulating layer; and performing a second patterning step to pattern the second metal nanowire layer to form the second touch sensing electrode.

In some embodiments of the present disclosure, removing the conductive layer located in the display area includes removing the conductive layer located in the display area by using a first etching solution.

In some embodiments of the present disclosure, performing the first patterning step includes simultaneously etching the conductive layer and the first metal nanowire layer with a second etching solution.

In some embodiments of the present disclosure, the method further includes forming a liquid crystal material layer on a second surface of the substrate, wherein the second surface is opposite to the first surface and forming the liquid crystal material layer includes coating and printing.

Some embodiments of the present disclosure provide a manufacturing method of a touch panel. A conductive layer is formed on a first surface of a substrate. The conductive layer located in the display area is removed. A first metal nanowire layer comprising metal nanowires is formed on the first surface of the substrate and a surface of the conductive layer. A first patterning step is performed, and includes patterning the first metal nanowire layer located in the display area to form a first touch sensing electrode, and simultaneously patterning the conductive layer and the first metal nanowire layer located in the peripheral area to form a first peripheral trace and a second peripheral trace. An insulating layer is made to cover the first touch sensing electrode and the second peripheral trace, wherein the insulating layer includes a conductive via disposed corresponding to the second peripheral trace. A second touch sensing electrode is made on the insulating layer, wherein the second touch sensing electrode is electrically connected to the second peripheral trace through the conductive via.

In some embodiments of the present disclosure, making the second touch sensing electrode on the insulating layer includes making a second metal nanowire layer comprising metal nanowires on the insulating layer; and performing a second patterning step to pattern the second metal nanowire layer to form the second touch sensing electrode.

In some embodiments of the present disclosure, removing the conductive layer located in the display area includes removing the conductive layer located in the display area by using a first etching solution.

In some embodiments of the present disclosure, performing the first patterning step includes simultaneously etching the conductive layer and the first metal nanowire layer with a second etching solution.

In some embodiments of the present disclosure, the method further includes forming a liquid crystal material layer on a second surface of the substrate, wherein the second surface is opposite to the first surface and forming the liquid crystal material layer includes coating and printing.

BRIEF DESCRIPTION OF THE DRAWINGS

FIG. 4B is a cross-sectional view along line B-B in FIG. 4.

FIG. 5A is a cross-sectional view along line A-A in FIG. 5.

DETAILED DESCRIPTION

Figure 1:
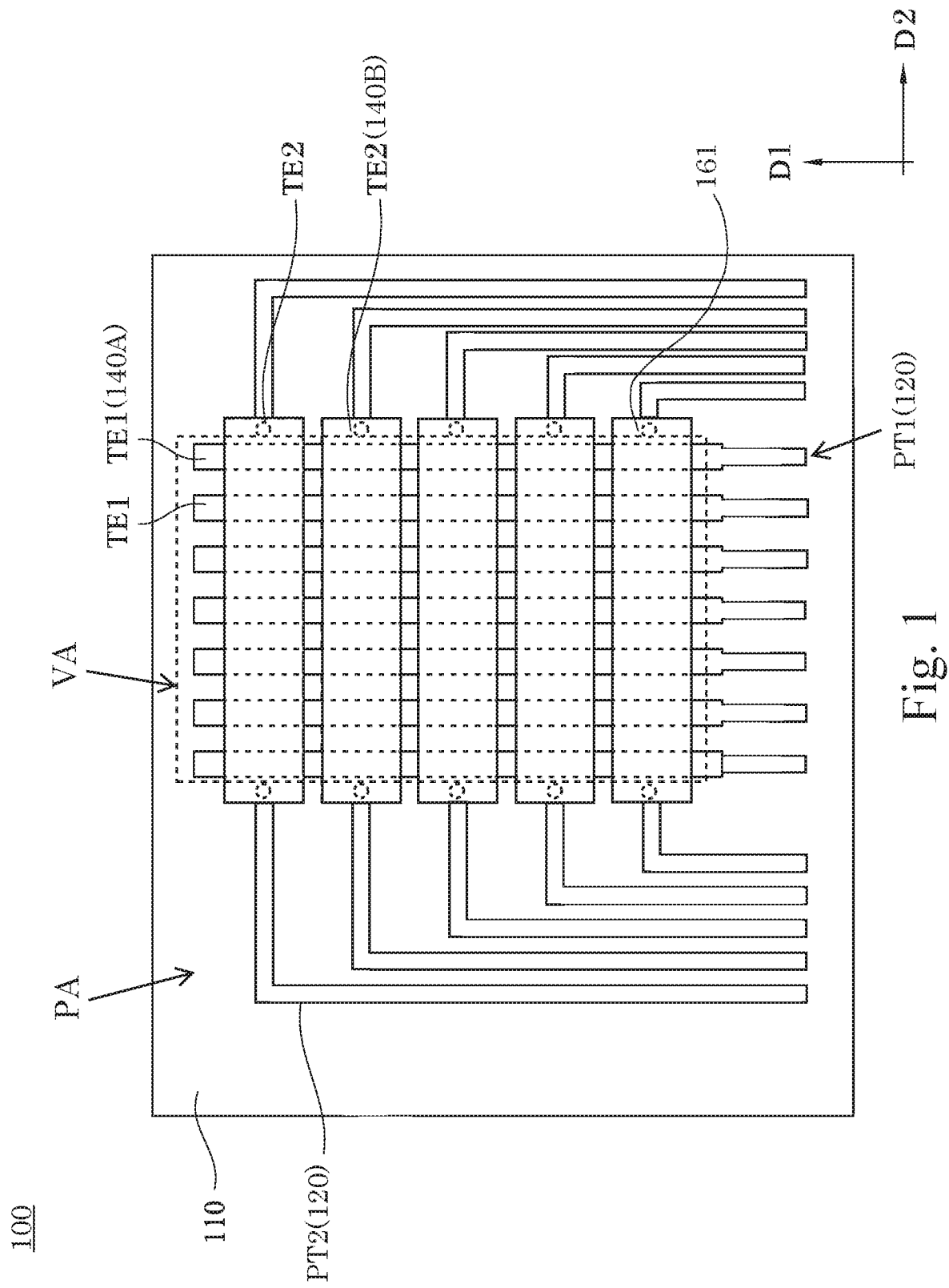
FIG. 1 is a schematic diagram of a touch panel according to some embodiments of the present disclosure.

The various embodiments of the present disclosure are disclosed in the drawings. However, it should be understood that these practical details are not intended to limit the invention. That is, in some embodiments of the invention, these practical details are not necessary. In addition, some of the conventional structures and elements are shown in the drawings in a simplified manner.

The terms "about", "approximately" or "substantially" used herein generally refer to the error or range of values is within 20%, preferably within 10%, and more preferably within 5%. Unless otherwise stated, the numerical values mentioned are considered as approximations. That is, they have an error or range as indicated by "about" or "rough". In addition, the terms "pattern", "graphic" as used herein mean the same or similar meanings, and for convenience of explanation, the terms may be used interchangeably.

Figure 6:
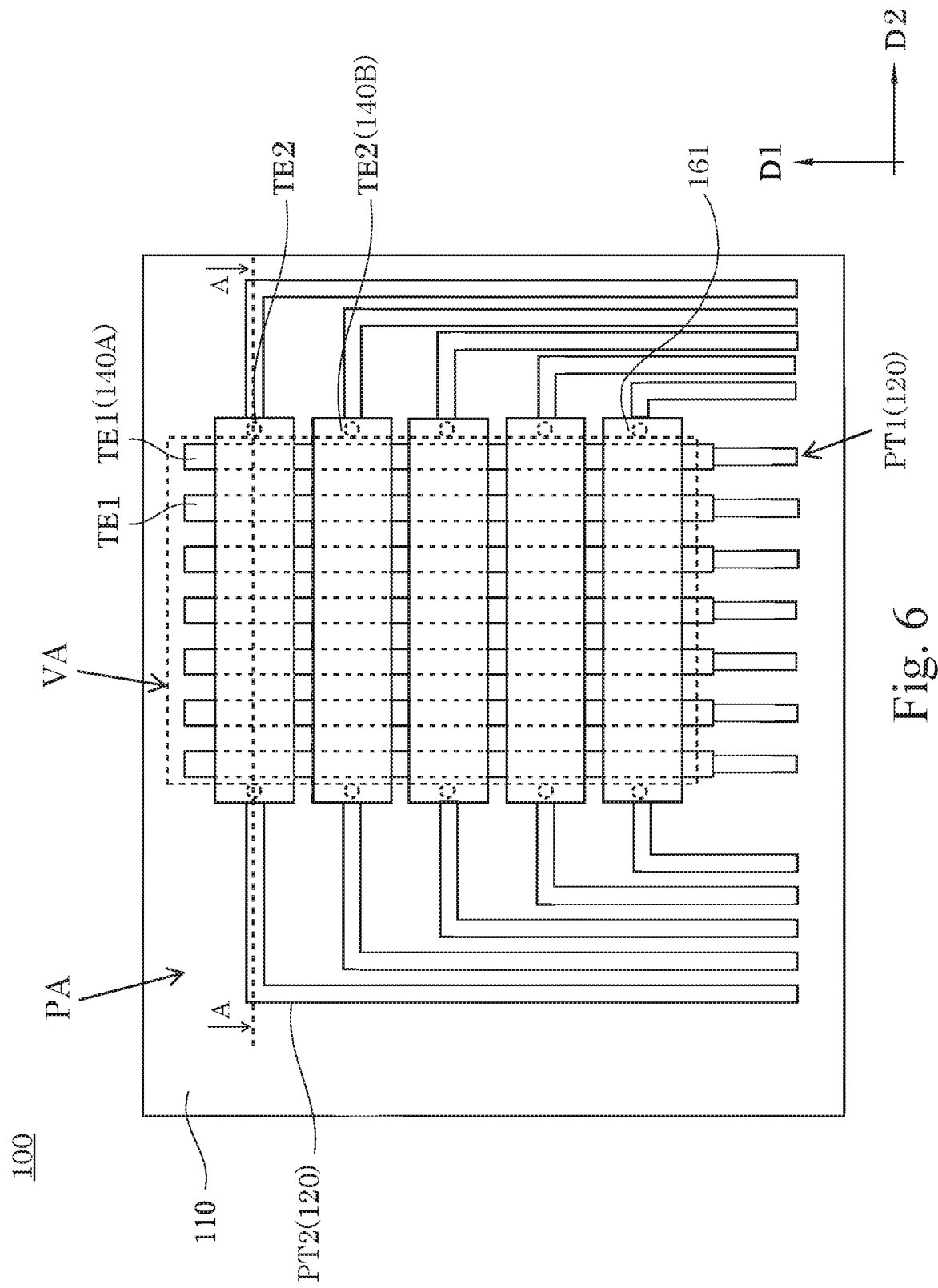
FIG. 6 is a schematic diagram of a fifth step of a manufacturing method of a touch panel according to some embodiments of the present disclosure.
Figure 6A:
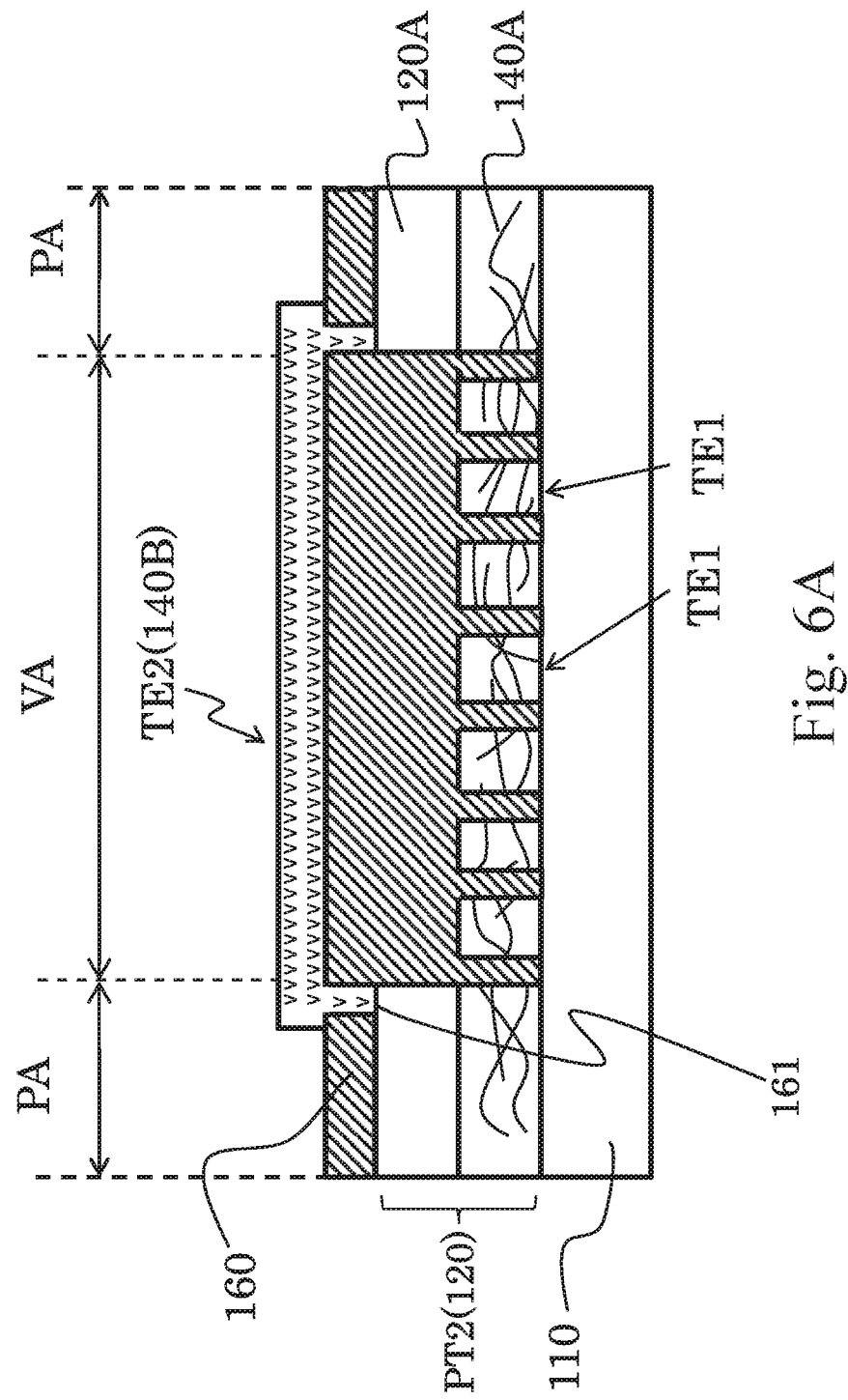
FIG. 6A is a cross-sectional view along line A-A in FIG. 6.

A touch panel 100 in accordance with various embodiments is shown in FIG. 1. The touch panel 100 includes a substrate 110, a peripheral trace 120, a first touch sensing electrode TE1 comprising a first metal nanowire layer 140A, and a second touch sensing electrode TE2 comprising a second metal nanowire layer 140B and an insulating layer 160 (shown in FIG. 6A) disposed between the first and second touch sensing electrodes TE1 and TE2. The first and second touch sensing electrodes TE1, TE2 are electrically connected to the peripheral trace 120. The peripheral trace 120 may comprise a conductive metal layer 120A and the first metal nanowire layer 140A (as shown in FIG. 6A). The number of the peripheral traces 120, the first touch sensing electrodes TE1, and the second touch sensing electrodes TE2 may be one or more, and the numbers drawn in the following specific embodiments and drawings are for illustrative purposes only.

Please refer to FIG. 1. The substrate 110 may have a display area VA and a peripheral area PA. The peripheral area PA is disposed at the side of the display area VA. For example, the peripheral area PA may be disposed at the four sides of the frame-shaped region of the display area VA (i.e., the right side, left side, upper side, and lower side). In some embodiments, the peripheral area PA be an L-shaped region which is disposed at the left side and lower side of the display area VA. As shown in FIG. 1, in this embodiment, seven sets of first peripheral traces PT1 and five sets of second peripheral traces PT2 are disposed on the peripheral area PA of the substrate 110. The first touch sensing electrode TE1 or the second touch sensing electrode TE2 is disposed substantially in the display area VA of the substrate 110.

A manufacturing method of the touch panel of FIG. 1 may include the following steps. A substrate 110 is provided. A first metal nanowire layer 140A comprising metal nanowires 140 is disposed on the substrate 110. A conductive layer 120A is disposed on the first metal nanowire layer 140A. A patterning step is performed to form the first touch sensing electrode TE1 and the peripheral trace 120 simultaneously.

In greater detail, the manufacturing process of the touch panel shown in FIG. 1 is as follows.

Figure 2:
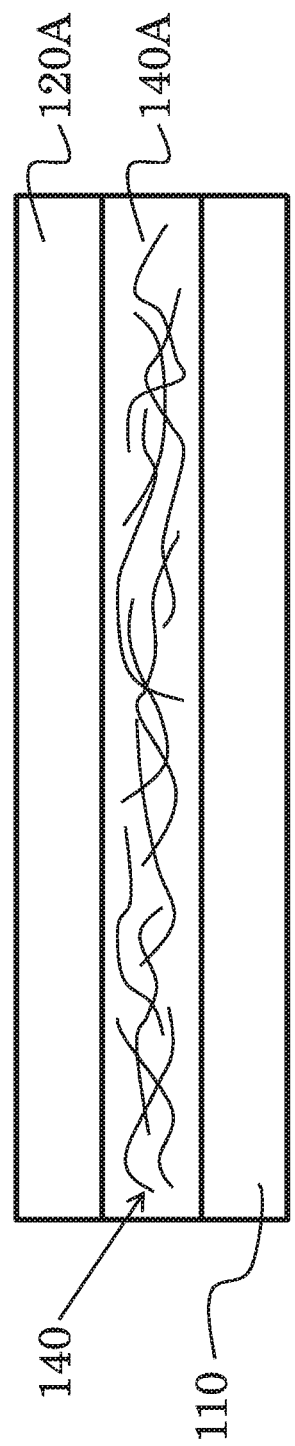
FIG. 2 is a schematic diagram of a first step of a manufacturing method of a touch panel according to some embodiments of the present disclosure.

Referring to FIG. 2, a substrate 110 is provided. In some embodiments of the present disclosure, the substrate 110 is ideally a transparent substrate, and in detail, may be a rigid transparent substrate or a flexible transparent substrate. The material of the substrate 110 may be selected from the transparent materials, such as glass, polymethylmethacrylate (PMMA), polyvinyl chloride (PVC), polypropylene (PP), polyethylene terephthalate (PET), polyethylene naphthalate (PEN), polycarbonate (PC), or polystyrene (PS).

Next, also referring to FIG. 2, a first metal nanowire layer 140A and a conductive layer 120A are formed on the substrate 110. The first metal nanowire layer 140A may at least include the metal nanowires 140. The first metal nanowire layer 140A is specifically formed by forming a dispersion or ink having the metal nanowires 140 on the first surface (e.g. the upper surface) of the substrate 110 by a coating method and drying the dispersion or ink to make the metal nanowires 140 cover the surface of the substrate 110. In other words, through the above curing and drying steps, the metal nanowires 140 form the first metal nanowire layer 140A disposed on the substrate 110. The display area VA and the peripheral area PA may be defined on the substrate 110 (as shown in FIG. 1). The peripheral area PA is disposed on the side of the display area VA. The first metal nanowire layer 140A may include a first portion formed in the display area VA and a second portion formed in the peripheral area PA. In more detail, in the display area VA, the first portion of the first metal nanowire layer 140A may be directly formed on the surface of the substrate 110; in the peripheral area PA, the second portion of the first metal nanowire layer 140A may also be directly formed on the surface of the substrate 110.

In embodiments of the present disclosure, the above dispersion having the metal nanowires 140 may be a solvent such as water, an alcohol, a ketone, an ether, a hydrocarbon or an aromatic solvent (benzene, toluene, xylene, etc.). The dispersion may contain an additive, an interface active agent, or a binder, such as carboxymethyl cellulose (CMC), hydroxyethyl cellulose (HEC), hydroxypropyl methylcellulose (HPMC), sulfonate, sulfate, disulfonate, sulfosuccinate, phosphate, or fluorosurfactant, etc. The metal nanowire layer may be, for example, a silver nanowire layer, a gold nanowire layer or a copper nanowire layer. In detail, "metal nanowires" as used herein is a collective term of the system, which refers to a set of metal lines including a plurality of elemental metals, metal alloys or metal compounds (including metal oxides), wherein the number of metal nanowires does not influence the claimed range of the present disclosure. Single metal nanowire has at least one cross-sectional dimension (i.e., the diameter of the cross-section) of less than 500 nm, preferably less than 100 nm, and more preferably less than 50 nm. The metal nanostructure, "wire" referred in the present disclosure, mainly has a high aspect ratio, for example, between 10 to 100,000. In more detail, the aspect ratio of the metal nanowires (length:diameter of the cross section) may be greater than 10, preferably greater than 50, and more preferably greater than 100. The metal nanowires may be any metal, including but not limited to, silver, gold, copper, nickel, and silver plated with gold. And other terms, such as silk, fiber, tube, etc, which also have the size and high aspect ratio as above, are also included in the scope of the present disclosure.

The dispersion or ink containing the metal nanowires 140 may be formed on the surface of the substrate 110 by any methods, including but not limited to, screen printing, nozzle coating, roller coating, etc. In at least one embodiment, the dispersion or ink containing the metal nanowires 140 is coated on continuously supplied substrate 110 by using a roll to roll process. After the curing/drying steps described above, a solvent or the like is volatilized, and the metal nanowires 140 are randomly distributed on the surface of the substrate 110. Preferably, the metal nanowires 140 are fixed on the surface of the substrate 110 without detachment to form the first metal nanowire layer 140A. The metal nanowires 140 may be in contact with each other to provide a continuous current path, thereby forming a conductive network.

In some embodiments of the present disclosure, the metal nanowires 140 may be silver nanowires or silver nanofibers, which may have an average diameter of about 20 nm to 100 nm and an average length of about 20 μm to 100 μm. Preferably, the metal nanowires 140 may have an average diameter of about 20 nm to 70 nm and an average length of about 20 μm to 70 μm (i.e., an aspect ratio of 1000). In some embodiments, the metal nanowires 140 can have a diameter between 70 nm and 80 nm and a length of about 8 μm.

In at least one embodiment, an overcoat layer (not shown) may be disposed on the first metal nanowire layer 140A, and after curing, the overcoat layer and the first metal nanowire layer 140A form a composite structure. In at least one embodiment, a suitable polymer or mixture thereof may be formed onto the first metal nanowire layer 140A by a coating process. The polymer may penetrate between the metal nanowires 140 to form a filler. And a curing step is applied to the polymer to form an overcoat layer. In other words, the metal nanowires 140 can be considered to be embedded in the overcoat layer. In a specific embodiment, the curing step may be: forming the above polymer or a mixture thereof on the first metal nanowire layer 140A by heating and baking (at a temperature between about 60° C. and about 150° C.). The present disclosure is not limited to the physical structure between the overcoat layer and the first metal nanowire layer 140A. For example, the overcoat layer and the first metal nanowire layer 140A can be a stack of two-layer structure, or the overcoat layer and the first metal nanowire layer 140A can be combined with each other to form a composite layer. Preferably, the metal nanowires 140 are embedded in the overcoat layer to form a composite type and are patterned in the subsequent process.

Preferred polymers described above can impart the metal nanowires 140 certain chemical, mechanical and optical properties, such as adhesion between the metal nanowires 140 and the substrate 110, or better physical mechanical strength, so the overcoat layer can also be referred to a matrix. In yet another aspect, the overcoat layer is formed by using certain polymers to provide the metal nanowires 140 with additional scratch and abrasion resistant surface protection, such as polyacrylate, epoxy resin, polyurethane, polydecane, silicone, poly (silicon-acrylic acid), etc. to make the metal nanowires 140 have higher surface strength to improve its scratch resistance. Further, a crosslinking agent, a polymerization inhibitor, a stabilizer (such as, but not limited to, an antioxidant, a UV stabilizer), a surfactant, or the like or a mixture thereof may be added to the polymer to improve the UV resistance ability of the composite structure, and extend the shelf life.

The specific formation process of the conductive layer 120A is as follows. A metal material is formed on the first metal nanowire layer 140A by a suitable process. For example, a metal having good electrical conductivity (for example, a single layer of silver, copper, or a multilayer material such as molybdenum/aluminum/molybdenum, copper/nickel, titanium/aluminum/titanium, molybdenum/chromium) is formed on the first metal nanowire layer 140A, but not limited thereto. Similar to the first metal nanowire layer 140A, the conductive layer 120A may include a first portion formed in the display area VA and a second portion formed in the peripheral area PA. The first portion of the conductive layer 120A is removed in the subsequent process. The second portion of the conductive layer 120A and the second portion of the first metal nanowire layer 140A are patterned in the subsequent process to form the peripheral trace 120.

Figure 3:
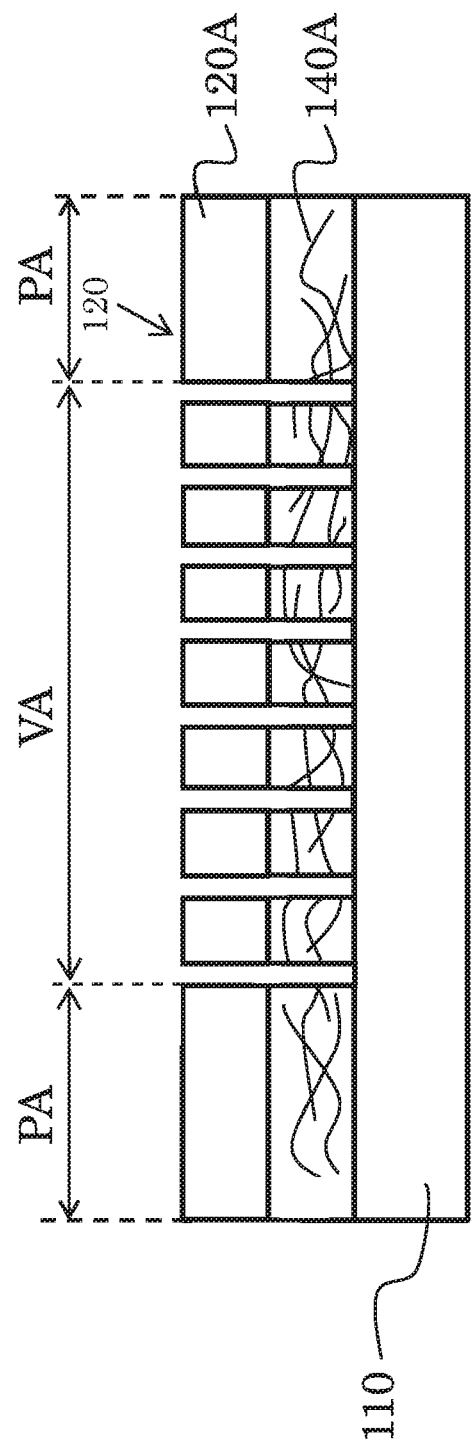
FIG. 3 is a schematic diagram of a second step of a manufacturing method of a touch panel according to some embodiments of the present disclosure.

Then, a first patterning step is performed, which is mainly for patterning the conductive layer 120A and the first metal nanowire layer 140A to form a pattern of the first touch sensing electrode TE1, and simultaneously for patterning the conductive layer 120A and the first metal nanowire layer 140A located in the peripheral area PA to form the peripheral trace 120 as shown in FIG. 3. The embodiment may specifically include the following steps. First, the photosensitive material (e.g. photoresist) is exposed/developed to define a pattern of the first touch sensing electrode TE1 located in the display area VA and a pattern of the peripheral trace 120 located in the peripheral area PA (i.e., a well-known lithography process). Next, etching is performed to form a pattern of the first touch sensing electrode TE1 comprising the first metal nanowire layer 140A on the display area VA. The peripheral trace 120 comprising the first metal nanowire layer 140A (i.e., the second portion of the first metal nanowire layer 140A) and the conductive layer 120A (i.e., the second portion of the conductive layer 120A) is formed on the peripheral area PA.

In at least one embodiment, an etching solution (i.e., a first etching solution) that can simultaneously etch the first metal nanowire layer 140A and the conductive layer 120A is used to form the first touch sensing electrode TE1 and the peripheral trace 120 in the same process. Therefore, the connection between the first touch sensing electrode TE1 of the display area VA and the peripheral trace 120 of the peripheral area PA can be completed with a minimum number of alignments (for example, one time), thereby avoiding low yield caused by the conventional multiple alignments and saving the alignment tolerances required for the alignment process to reduce the width of the peripheral trace 120 as much as possible to meet the requirement for the narrow border of display.

According to a specific embodiment, in the case that the first metal nanowire layer 140A is a nano-silver layer and the conductive layer 120A is a copper layer, the first etching solution can be used for etching copper and silver. For example, the main component of the etching solution is $HNO_3$ (ratio of 5% to 15%) and $H_3PO_4$ (ratio of 55% to 70%) and is used to remove the copper material and silver material in the same process. In another embodiment, in addition to the main component of the etching solution, an additive, such as an etch selectivity ratio modifier, may be added to adjust the copper etching rate and the silver etching rate. For example, the main components of $HNO_3$ (ratio of 5% to 15%) and $H_3PO_4$ (ratio of 55% to 70%) is added with 5% to 10% of benzotriazole (BTA) to solve the problem of over-etching copper.

Next, a second patterning step is performed, which is mainly for patterning the conductive layer 120A to remove the metal material located in the display area VA, and exposing the first touch sensing electrode TE1, which is formed by patterning the first metal nanowire layer 140A. The embodiment may specifically include the following steps. First, the photosensitive material (e.g. photoresist) is exposed/developed to define a pattern to expose a first portion of the conductive layer 120A in the display area VA (i.e., a well-known photo lithography process). Next, etching is performed to remove the first portion of the conductive layer 120A located in the display area VA, so that the first metal nanowire layer 140A is exposed on the display area VA (at this time, the first metal nanowire layer 140A has a pattern, i.e., the first touch sensing electrode TE1).

In the above etching steps, for example, in the case that the first metal nanowire layer 140A is a nano-silver layer, and the conductive layer 120A is a copper layer, the second etching solution can be used for etching copper, and has a significantly lower silver etching rate to avoid that the nano-silver layer is influenced by the copper etching solution. In a specific embodiment, the main components of the copper etching solution are $CH_3COOH$ and $NH_4OH$, and the etching rate of the etching solution components to the silver nanowires is much lower than the etching rate to copper (for example, the etching rate ratio of the two is 1:100 to 1:10000). In at least one embodiment, the variation of the resistance value of the first metal nanowire layer 140A is under 10% after the etching solution treatment.

In an alternative embodiment, the conductive layer 120A located in the display area VA is removed. Next, a second patterning step is performed, which is mainly for patterning the first metal nanowire layer 140A in the display area VA to form the first touch sensing electrode TE1 and simultaneously patterning the conductive layer 120A and the first metal nanowire layer 140A located in the peripheral area PA to form the peripheral trace 120.

Figure 4:
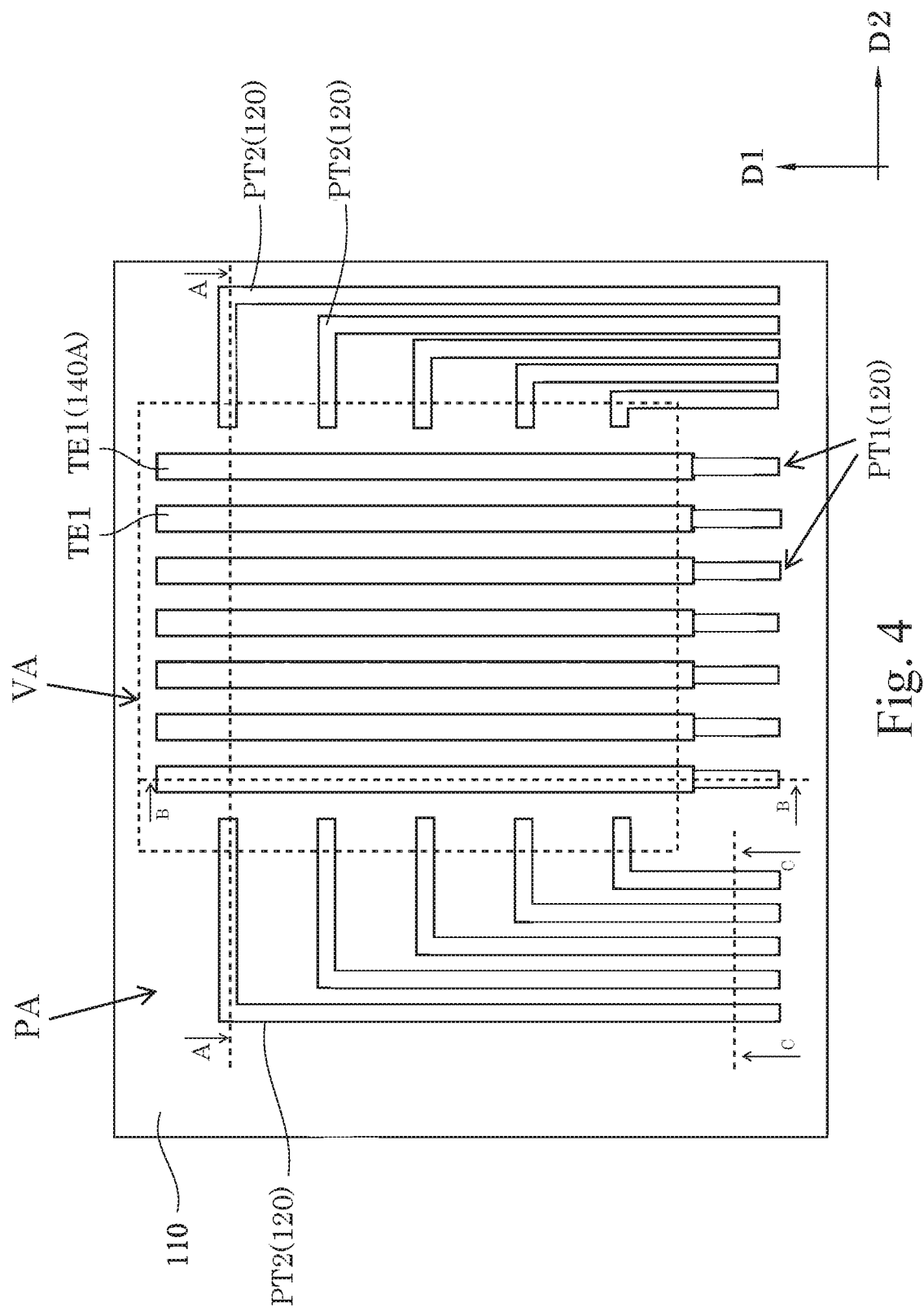
FIG. 4 is a schematic diagram of a third step of a manufacturing method of a touch panel according to some embodiments of the present disclosure.
Figure 4A:
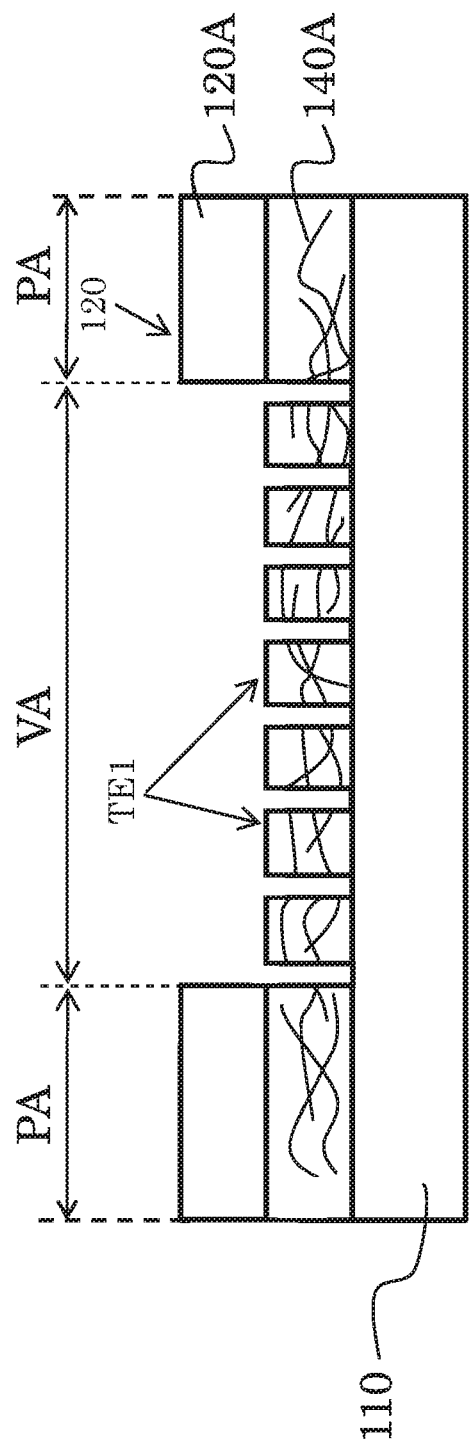
FIG. 4A is a cross-sectional view along line A-A in FIG. 4.

FIG. 4 shows the structure after the above two patterning steps. The first touch sensing electrode TE1 comprising the first metal nanowire layer 140A (i.e., the first portion of the first metal nanowire layer 140A) is formed on the display area VA. The peripheral trace 120 comprising the first metal nanowire layer 140A (i.e., the second portion of the first metal nanowire layer 140A) and the conductive layer 120A (i.e., the second portion of the conductive layer 120A) is formed on the peripheral area PA. In addition, please referring to FIG. 4, FIG. 4A, and FIG. 4B simultaneously, the peripheral trace 120 may include a first peripheral trace PT1 and a second peripheral trace PT2. The first touch sensing electrode TE1 is electrically connected to the first peripheral trace PT1. The second peripheral trace PT2 is connected to the second touch sensing electrode TE2 made in the subsequent process. The second peripheral trace PT2 is located at the two ends of the second touch sensing electrode TE2, but not limited thereto. The second peripheral trace PT2 can be formed at one end of the second touch sensing electrode TE2.

Figure 5:
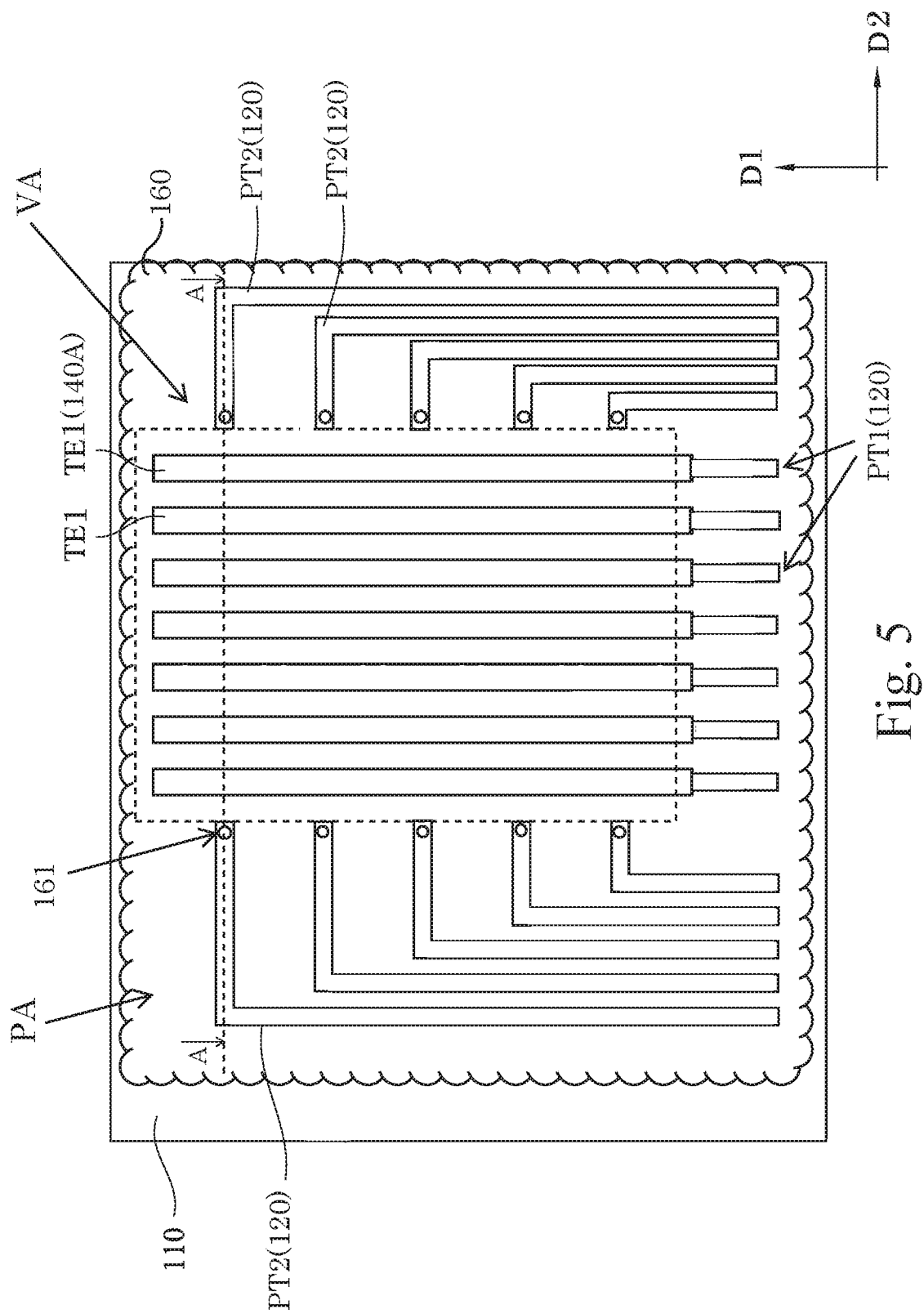
FIG. 5 is a schematic diagram of a fourth step of a manufacturing method of a touch panel according to some embodiments of the present disclosure.

Next, an insulating layer 160 is made. Moreover, a conductive via 161 is formed during making the insulating layer 160 as shown in FIG. 5. In at least one embodiment, an insulating material such as $SiO_2$ may be used to cover the first metal nanowire layer 140A and the conductive layer 120A. In other words, the first touch sensing electrode TE1 located in the display area VA and the peripheral trace 120 located in the peripheral area PA are covered with the insulating layer 160. In at least one embodiment, the insulating layer 160 may only cover the first touch sensing electrode TE1 and the second peripheral trace PT2.

The material of the insulating layer 160 may be completely or partially filled into the etched voids in the first metal nanowire layer 140A or the conductive layer 120A. In addition, the conductive via 161 can be formed in the insulating layer 160 by a photo lithography process or a laser process. The conductive via 161 corresponds to a portion of the peripheral trace 120, thereby being beneficial to connecting the subsequently manufactured electrode structure and the peripheral trace 120 through the conductive via 161. As shown in FIG. 5A, the conductive via 161 corresponds to the second peripheral trace PT2. And the second peripheral trace PT2 is exposed. The conductive via 161 is substantially located at the boundary of the display area VA and the peripheral area PA. The position of the conductive via 161 may be adjusted according to specific needs.

Then, the second touch sensing electrode TE2 is formed on the insulating layer 160, and the second touch sensing electrode TE2 is connected to the corresponding peripheral trace 120. Specifically, the step may include the following steps. A second metal nanowire layer 140B is formed on the insulating layer 160. The second metal nanowire layer 140B is patterned to form the second touch sensing electrode TE2. The steps of forming the nanowire layer and patterning can be referred to the previous embodiments, and will not be described herein. In addition, the material of the second metal nanowire layer 1408 may be completely or partially filled into the conductive via 161, so that the second touch sensing electrode TE2, which is formed after patterning the second metal nanowire layer 1408, connects the peripheral trace 120 disposed on the substrate 110. In at least one embodiment, the patterning of the second metal nanowire layer 1408 can be performed by using nitric acid as an etching solution.

Referring to FIG. 6A, the second touch sensing electrode TE2 can be connected to the second peripheral trace PT2 disposed on the substrate 110 by the structure of the conductive via 161. In the present embodiment, a single second touch sensing electrode TE2 corresponds to a pair or a set of second peripheral traces PT2. Correspondingly, the insulating layer 160 includes a pair of conductive vias 161. A single second touch sensing electrode TE2 is electrically connected to the pair of second peripheral traces PT2 with the pair of conductive vias 161. The second touch sensing electrode TE2 forms a bridge structure on the insulating layer 160. In other words, the two ends of the bridge structure are respectively connected to the pair of second peripheral traces PT2.

At this point, the touch panel 100 of the embodiment of the present disclosure can be completed. Referring to FIG. 6, the touch panel 100 according to an embodiment of the present disclosure includes the substrate 110, the peripheral trace 120 comprising the conductive layer 120A and the first metal nanowire layer 140A, the first touch sensing electrode TE1 comprising the first metal nanowire layer 140A, the second touch sensing electrode TE2 comprising the second metal nanowire layer 140B, and the insulating layer 160 disposed between the first touch sensing electrode TE1 and the second touch sensing electrode TE2. The first touch sensing electrode TE1 and the second touch sensing electrode TE2 are electrically connected to the peripheral trace 120. The first metal nanowire layer 140A and/or the second metal nanowire layer 140B include metal nanowires 140. In addition, the conductive layer 120A and the first metal nanowire layer 140A are co-etched to simultaneously form the first touch sensing electrode TE1 and the peripheral trace 120 disposed on the upper surface of the substrate (in the same etching step).

In detail, in some embodiments of the present disclosure, the peripheral trace 120 may include the first and second peripheral traces PT1/PT2 connecting the electrodes in different axial directions. In terms of the structure, the first and second peripheral traces PT1/PT2 are a composite structure comprising two patterned conductive layers, which includes the conductive layer 120A and the first metal nanowire layer 140A between the conductive layer 120A and the substrate 110. The conductive layer 120A and the first metal nanowire layer 140A (i.e., the second portion of the first metal nanowire layer 140A), which constitute the peripheral trace 120, have a coplanar etched surface. The first touch sensing electrode TE1 is formed after the first metal nanowire layer 140A is patterned. That is, the first metal nanowire layer 140A forms the first touch sensing electrode TE1 in the display area VA, and forms the lower layer structure of the peripheral trace 120 in the peripheral area PA. Therefore, the first touch sensing electrode TE1 can be electrically connected to the peripheral trace 120 for signal transmission by the conductivity of the first metal nanowire layer 140A. In addition, by the insulating layer 160, the first metal nanowire layer 140A and the second metal nanowire layer 1408 are electrically insulated from each other, and the signals transmitted by the patterned first touch sensing electrode TE1 and second touch sensing electrode TE2 may not affect each other. For example, the first touch sensing electrode TE1 arranged along the first direction D1 may be used to transmit an external control signal, and the second touch sensing electrode TE2 arranged along the second direction D2 may be used to transmit a touch sensing signal.

Figure 4C:
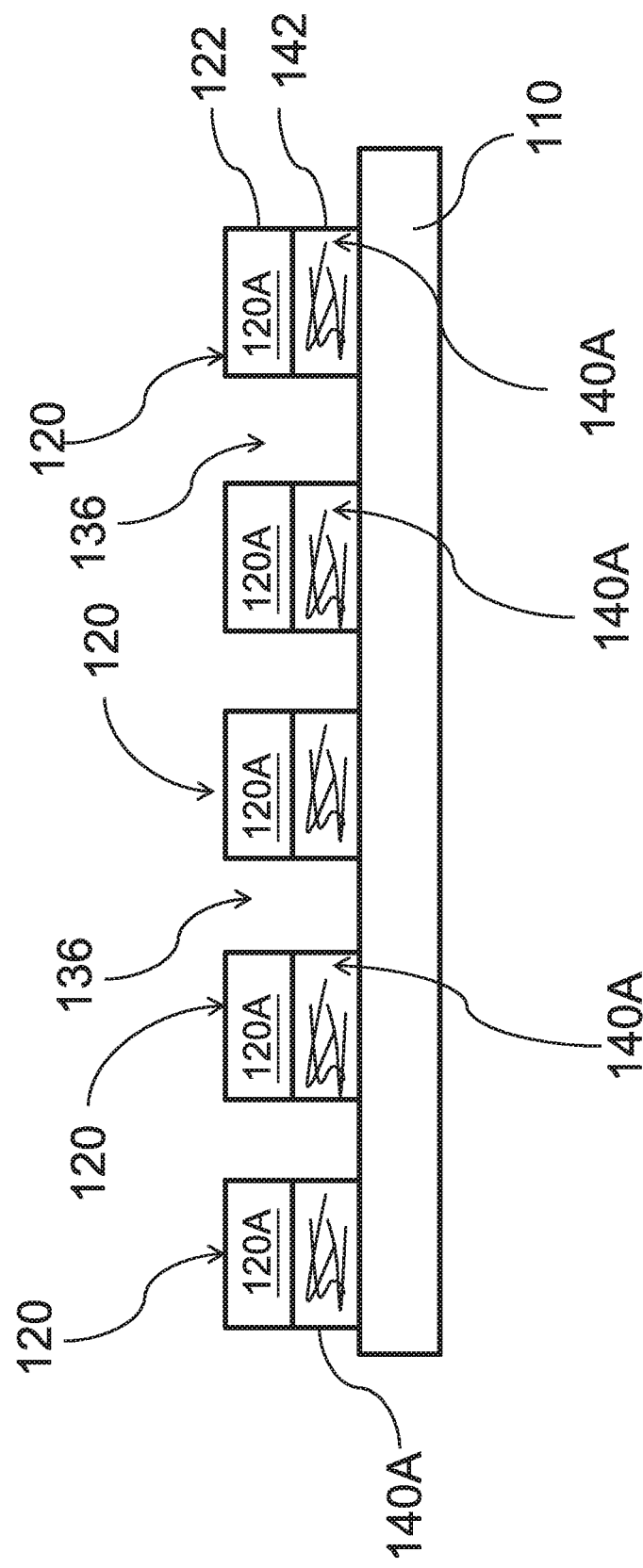
FIG. 4C is a cross-sectional view along line C-C in FIG. 4.

Referring to FIG. 4 and FIG. 4C, in the peripheral area PA, there is a non-conductive area 136 between adjacent peripheral traces 120 (there is exemplarily explained by the second peripheral trace PT2) to electrically insulate adjacent peripheral traces 120 to avoid short circuits. That is, the non-conductive area 136 is between the first side walls 122 of the adjacent conductive layers 120A and is between the second sidewalls 142 of the adjacent metal nanowire layer 140A. In the present embodiment, the non-conductive area 136 is a gap to insulate the adjacent peripheral traces 120. In at least one embodiment, the gap can be formed by the above etching method, so that the first sidewall 122 and the second sidewall 142 are a coplanar etched surface. In other words, the first sidewall 122 and the second sidewall 142 are formed in the same etching step by using the same etching solution. Or the first sidewall 122 is formed by etching first, and subsequently the second sidewall 142 is also formed by etching. In at least one embodiment, the second sidewall 142 of the metal nanowire layer 140A may not have the metal nanowires present thereon due to the etching step described above. Further, the conductive layer 120A and the metal nanowire layer 140A would have the same or similar patterns and dimensions, such as patterns that are all long straight, and widths that are the same or similar.

Similarly, in the display area VA, there is a non-conductive area 136 between adjacent first touch sensing electrodes TE1 to electrically insulate adjacent first touch sensing electrodes TE1 to avoid short circuits. There is also a non-conductive area 136 between adjacent second touch sensing electrodes TE2. In at least one embodiment, the gap between the adjacent first touch sensing electrodes TE1 or the gap between the adjacent second touch sensing electrodes TE2 may be formed by the above etching method.

In this embodiment, the first touch sensing electrode TE1 and the second touch sensing electrode TE2 are intersected. For example, the first touch sensing electrode TE1 is an elongated electrode extending in the first direction D1, and the second touch sensing electrode TE2 is an elongated electrode extending in the second direction D2, forming an intersected structure. In other embodiments, the first touch sensing electrode TE1 and/or the second touch sensing electrode TE2 may have a suitable shape, such as a quadrilateral or hexagonal structure connected in series, and the scope of the present disclosure is not limited by the embodiments herein.

In the present embodiment, the first touch sensing electrode TE1 and/or the second touch sensing electrode TE2 of the display area VA preferably have conductivity and light transmittance. Therefore, the nanowire layer used for forming the first touch sensing electrode TE1 and/or the second touch sensing electrode TE2 preferably has the following characteristics: the transmittance to visible light (for example, a wavelength between about 400 nm and 700 nm) can be greater than about 80%, and the surface resistance is between about 10 to 1000 ohms/square. Preferably, the nanowire layer has the transmittance to visible light (for example, a wavelength between about 400 nm and 700 nm) greater than about 85%, and the surface resistance between about 50 to 500 ohms/square.

Figure 7:
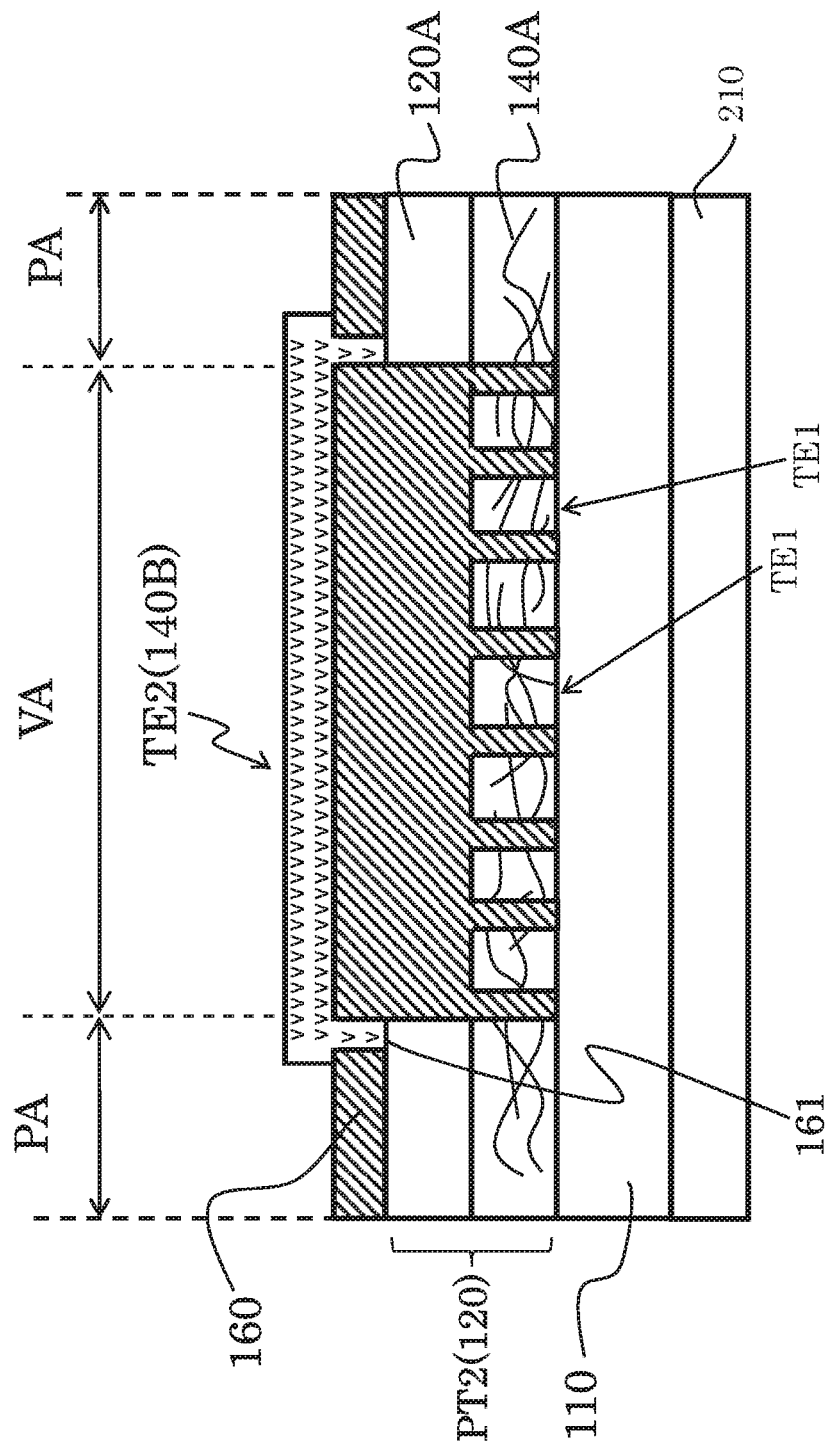
FIG. 7 is a schematic diagram of a touch panel according to some embodiments of the present disclosure.

In at least one embodiment, the above completed touch panel 100 can be further used in the following processes. Referring to FIG. 7, a liquid crystal material layer 210 may be formed on the second surface (e.g. lower surface) of the substrate 110 opposite to the touch electrodes. In at least one embodiment, the completed touch panel 100 may be integrated with the liquid crystal material layer 210 to form a touch panel with optical function. For example, the liquid crystal material layer 210 may be an optical functional layer providing a polarizing function (it is also referred to as a polarized liquid crystal layer). In this embodiment, a touch panel with a polarizing function can be formed. Or two liquid crystal material layers 210 can be formed. One provides a polarizing function (it is also referred to as a polarized liquid crystal layer), and the other provides a function of adjusting the optical phase difference (it is also referred to as a phase difference liquid crystal layer). Therefore, the two can be integrated to a composite optical function layer to simultaneously provide the functions of touch sensing, polarization, and phase difference adjustment.

In at least one embodiment, the polarized liquid crystal layer is formed by coating the composition containing the polymerizable liquid crystal on the second surface of the substrate and then curing. The composition of the polymerizable liquid crystal may contain a reactive liquid crystal compound and a dichroic dye. When the reactive liquid crystal compound is polymerized by a reaction (light irradiation or heat irradiation), it can maintain the liquid crystal configuration and form a polymer network structure, and the dichroic dye can provide a polarizing property.

The phase difference liquid crystal layer is formed by forming a photoalignment layer having two alignment directions on the polarized liquid crystal by using a photoalignment material, coating the composition containing the polymerizable liquid crystal on the photoalignment layer, and curing the composition.

The coating method used for fabricating the polarized liquid crystal layer and the phase difference liquid crystal layer may include slit coating, blade coating, gravure coating, bar coating, roll coating, spin coating, spray coating, screen printing, gravure printing, lithography, dispensing printing, and the like. Further, the curing method used to form the polarized liquid crystal layer and the phase difference liquid crystal layer may include thermal curing or photo curing. In at least one embodiment, a roll to roll process can be used to perform the coating and curing steps described above. In addition, in the actual design, the polarized liquid crystal layer can be designed as a plurality of laminated structures in order to meet the required polarization value, and the phase difference liquid crystal layer can be designed as a plurality of laminated structures in order to meet the required phase difference value, but the invention is not limited thereto.

After integrating the polarized liquid crystal layer, the touch panel of the embodiment can provide a polarizing function. And after integrating the phase difference liquid crystal layer, the touch panel can further provide better image visibility. The whole structure forms an integrated design on the same substrate. Therefore, when the touch panel is applied to an electronic device having a display function, the effect of thinning can be effectively achieved. It is to be noted that, in this embodiment, the manufacture of the touch panel is completed, and then a polarized liquid crystal layer and/or a phase difference liquid crystal layer is formed on a side of the touch panel which is without a touch sensing electrode. It can avoid damage to components (such as liquid crystal layer) caused by environmental factors such as high temperature, strong acid and strong alkali during manufacturing the touch sensing electrode.

The embodiment of the present disclosure provides another method for manufacturing a touch panel, which differs from the first manufacturing method at least in that: in this embodiment, the conductive layer 120A is first formed in the peripheral area PA; subsequently the first metal nanowire layer 140A is formed; next, the first touch sensing electrode TE1 and the peripheral trace 120 are formed by the previous method; the insulating layer 160 is formed; and finally, the second touch sensing electrode TE2 is formed.

Figure 8:
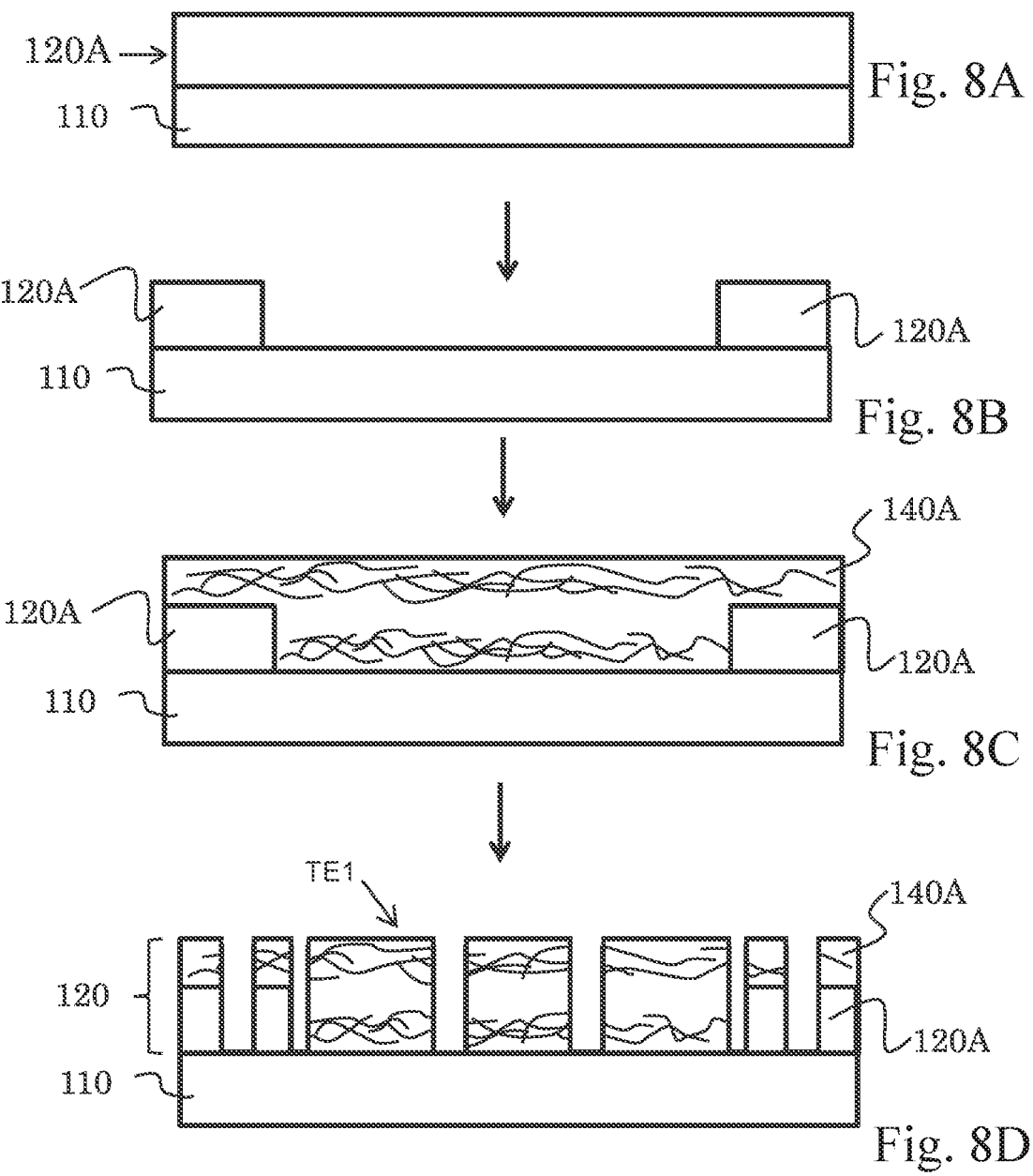
FIGS. 8A-8D are schematic diagrams of steps of a manufacturing method of a touch panel according to some embodiments of the present disclosure.

For example, the specific method is as follow. As shown in FIG. 8A, a conductive layer 120A is first formed on a surface (such as the upper surface) of the substrate 110. The conductive layer 120A located in the display area VA is removed through an etching process. The remaining conductive layer 120A is located substantially in the peripheral area PA. The above is the first patterning process (as shown in FIG. 8B). Next, a first metal nanowire layer 140A is formed in the peripheral area PA and the display area VA. A first portion of the first metal nanowire layer 140A is formed directly on the surface of the substrate 110, and a second portion of the first metal nanowire layer 140A covers the conductive layer 120A (as shown in FIG. 8C). Then a second patterning process is performed by a co-etching process. In the second patterning step, the first metal nanowire layer 140A located in the display area VA is etched to form the first touch sensing electrode TE1, and the conductive layer 120A and the metal nanowire layer 140A located in the peripheral area PA are patterned by etching to form a peripheral trace 120 (as shown in FIG. 8D). Then, an insulating layer 160 and a second touch sensing electrode TE2 are formed. The specific embodiments of these two steps are similar to the foregoing embodiments, and details are not described herein again.

Figure 9:
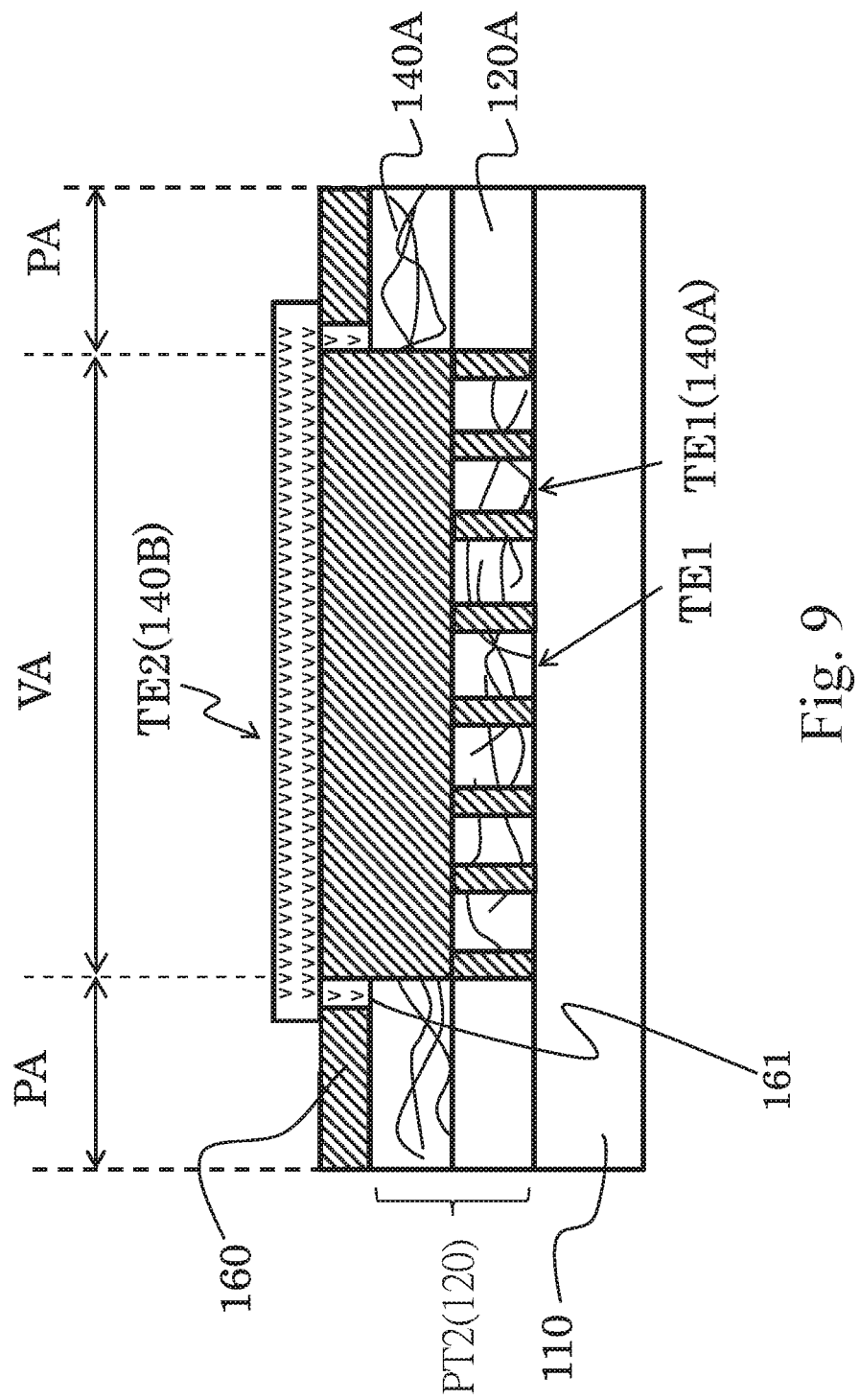
FIG. 9 is a schematic diagram of a touch panel according to some embodiments of the present disclosure.

FIG. 9 is a schematic view of a touch panel fabricated according to the manufacturing method of FIGS. 8A-8D.

The specific content of this embodiment can be referred to the foregoing, and details are not described herein again. Compared to FIG. 6A, in the structure shown in FIG. 9, the peripheral trace 120 located in the peripheral area PA is a double layer structure (based on the substrate 110) having an upper first metal nanowire layer 140A and a lower conductive layer 120A. That is, in this structure, even if the metal nanowires 140 are protected by the aforementioned overcoat layer, the metal nanowires 140 is still in direct contact with the conductive layer 120A, so that there is a low contact resistance between the two, thereby improving the loss and distortion of the transmitted touch signal.

As the foregoing embodiment, a liquid crystal material layer 210 can be formed on the other surface (such as the lower surface) of the substrate 110, and details are not described herein again.

In at least one embodiment, the previously formed metal nanowires 140 may be further post-treated to increase their conductivity. The post-treatment may be a step including, for example, applying heat, plasma, corona discharge, UV ozone or pressure. For example, after the step of curing to form the first and second metal nanowire layers 140A, 140B, pressure can be applied thereto by a roller. In one embodiment, the metal nanowire layer can be pressured by one or more rollers. The layer is applied at a pressure of from 50 to 3400 psi, preferably from 100 to 1000 psi, from 200 to 800 psi, or from 300 to 500 psi. In some embodiments, the heating and pressuring of the post-treatment can be performed simultaneously. In detail, the formed metal nanowires 140 can be applied with pressure via one or more rollers as described above and heated simultaneously. The pressure is from 10 to 500 psi, preferably from 40 to 100 psi; and the roller is heated to between about 70° C. and 200° C., preferably between about 100° C. and 175° C., which increases the conductivities of the first and second metal nanowire layers 140A, 140B. In some embodiments, the metal nanowires 140 are preferably exposed to a reducing agent for post-treatment. For example, the metal nanowires 140 comprising silver nanowires are preferably exposed to a silver reducing agent for post-treatment. The silver reducing agent includes a hydroboron such as sodium borohydride; a boron-nitrogen compound such as dimethylaminoborane (DMAB); or a gas reducing agent such as hydrogen gas ($H_2$). The exposure time is from about 10 seconds to about 30 minutes, preferably from about 1 minute to about 10 minutes. The above steps of applying pressure can be carried out in appropriate steps according to actual needs.

The structures, materials, and processes of the various embodiments of the present disclosure may be referred to each other and are not intended to limit the above each specific embodiment.

In some embodiments of the present disclosure, the peripheral metal layer coating process applied to the biaxial touch sensing electrode can be reduced to a single time, and the peripheral metal layer can be connected to the first and second touch sensing electrodes on the upper and lower sides of the insulating layer to achieve the effect of simplifying the process.

In some embodiments of the present disclosure, the initial process can be started on metal nanowire layer or a metal layer (i.e., a conductive layer), so that the process is flexible.

In some embodiments of the present disclosure, the conductive layer in the peripheral area may directly contact the metal nanowire layer to form a peripheral trace. Therefore, overall, due to the metal nanowires in the metal nanowire layer and the peripheral trace forming a direct contact and low impedance signal transmission path for transmitting the control signal and the touch sensing signal between the touch sensing electrode and the external controller, the low impedance characteristic helps to reduce the loss of signal transmission. Accordingly, the problem of high contact resistance in the conventional structure can be solved.

In some embodiments of the present disclosure, a low-impedance peripheral conductive trace can be formed to enhance the transmission capability of the touch signal, thereby reducing the loss and distortion of the transmitted touch signal.

In some embodiments of the present disclosure, the composite structure layer of the peripheral trace can be formed in a single etching process. It can be applied in the manufacture of the touch panel, and can simplify the patterning process of the peripheral trace. The process is simple, fast, and has a low production cost.

In some embodiments of the present disclosure, the composite structure layer of the peripheral trace can be formed in a single etching process, so that the number of alignments required in the process can be reduced, thereby avoiding errors generated in the alignment step, thereby improving the process yield.

In some embodiments of the present disclosure, the composite structure layer of the peripheral trace can be formed in a single etching process, so that the alignment error space reserved in the process can be saved, thereby effectively reducing the width of the peripheral area.

In some embodiments of the present disclosure, the optical functional layer is formed on the other side of the substrate (opposite to the touch sensing electrode) to form a highly integrated product having both a touch function and an optical function.

In some embodiments of the present disclosure, the process can be combined with a roll-to-roll production technique to produce a continuous, large batch of touch panels with a single-sided/double-sided electrode structure.

While the invention has been described above in terms of various embodiments, it is not intended to limit the invention. The invention may be modified and varied without departing from the spirit and scope of the invention. The scope of the present disclosure is subject to the appended claims.

What is claimed is:

1. A touch panel having a display area and a peripheral area, the touch panel comprising:
    a substrate;
    a first touch sensing electrode disposed on a first surface of the substrate and located in the display area, the first touch sensing electrode comprising a first portion of a first metal nanowire layer, which is patterned;
    a first peripheral trace and a pair of second peripheral traces disposed on the first surface of the substrate and located in the peripheral area, the first peripheral trace being electrically connected to the first touch sensing electrode, the first peripheral trace and the pair of second peripheral traces each comprising a conductive layer and a second portion of the first metal nanowire layer, the conductive layer and the second portion of the first metal nanowire layer having a coplanar etched surface;
    an insulating layer covering the first touch sensing electrode and the pair of second peripheral traces, wherein the insulating layer comprises a pair of conductive vias disposed corresponding to the pair of second peripheral traces; and a second touch sensing electrode disposed on the insulating layer, the second touch sensing electrode comprising a second metal nanowire layer, which is patterned, wherein the second touch sensing electrode is electrically connected to the pair of second peripheral traces through the pair of conductive vias and forms a bridge structure on the insulating layer.

2. The touch panel of claim 1, wherein the second portion of the first metal nanowire layer is disposed on the first surface of the substrate, and the conductive layer is disposed on the second portion of the first metal nanowire layer, or the conductive layer is disposed on the first surface of the substrate, and the second portion of the first metal nanowire layer is disposed on an upper surface of the conductive layer.

3. The touch panel of claim 1, further comprising an overcoat layer disposed on at least one of the first metal nanowire layer or the second metal nanowire layer.

4. The touch panel of claim 1, further comprising a liquid crystal material layer disposed on a second surface of the substrate, wherein the second surface is opposite to the first surface.

5. The touch panel of claim 4, wherein the liquid crystal material layer comprises at least one of a polarized liquid crystal layer or a phase difference liquid crystal layer.

6. The touch panel of claim 1, wherein the conductive layer comprises at least one of silver, copper, molybdenum, aluminum, nickel, titanium, or chromium.

7. A manufacturing method of a touch panel, the touch panel having a display area and a peripheral area, and the manufacturing method of the touch panel comprising:
    forming a first metal nanowire layer comprising metal nanowires on a first surface of a substrate;
    forming a conductive layer on the first metal nanowire layer;
    performing a first patterning step, comprising: patterning the first metal nanowire layer located in the display area, and simultaneously patterning the conductive layer and the first metal nanowire layer located in the peripheral area to form a first peripheral trace and a second peripheral trace;
    removing the conductive layer located in the display area to expose a first touch sensing electrode formed by patterning the first metal nanowire layer;
    forming an insulating layer covering the first touch sensing electrode and the second peripheral trace, wherein the insulating layer comprises a conductive via disposed corresponding to the second peripheral trace; and
    forming a second touch sensing electrode on the insulating layer, wherein the second touch sensing electrode is electrically connected to the second peripheral trace through the conductive via.

8. The method of manufacturing the touch panel of claim 7, wherein forming the second touch sensing electrode on the insulating layer comprises:
    forming a second metal nanowire layer comprising metal nanowires on the insulating layer; and
    performing a second patterning step to pattern the second metal nanowire layer to form the second touch sensing electrode.

9. The method of manufacturing the touch panel of claim 7, wherein performing the first patterning step comprises simultaneously etching the conductive layer and the first metal nanowire layer with a first etching solution.

10. The method of manufacturing the touch panel of claim 9, wherein removing the conductive layer located in the display area comprises removing the conductive layer located in the display area by using a second etching solution.

11. The method of manufacturing the touch panel of claim 7, wherein the touch panel comprises a pair of the second peripheral traces, the insulating layer comprises a pair of the conductive vias corresponding to the pair of the second peripheral traces, the second touch sensing electrode is electrically connected to the pair of the second peripheral traces through the pair of the conductive vias and forms a bridge structure on the insulating layer.

12. The method of manufacturing the touch panel of claim 7, further comprising: forming a liquid crystal material layer on a second surface of the substrate, the second surface being opposite to the first surface, wherein forming the liquid crystal material layer comprises coating and printing.

13. The method of manufacturing the touch panel of claim 12, wherein the liquid crystal material layer comprises at least one of a polarized liquid crystal layer or a phase difference liquid crystal layer.

14. A manufacturing method of a touch panel, the touch panel having a display area and a peripheral area, and the manufacturing method of the touch panel comprising:
    forming a conductive layer on a first surface of a substrate;
    removing the conductive layer located in the display area;
    forming a first metal nanowire layer comprising metal nanowires on the first surface of the substrate and a surface of the conductive layer;
    performing a first patterning step, comprising: patterning the first metal nanowire layer located in the display area to form a first touch sensing electrode, and simultaneously patterning the conductive layer and the first metal nanowire layer located in the peripheral area to form a first peripheral trace and a second peripheral trace;
    forming an insulating layer covering the first touch sensing electrode and the second peripheral trace, wherein the insulating layer comprises a conductive via disposed corresponding to the second peripheral trace; and
    forming a second touch sensing electrode on the insulating layer, wherein the second touch sensing electrode is electrically connected to the second peripheral trace through the conductive via.

15. The manufacturing method of the touch panel of claim 14, wherein forming the second touch sensing electrode on the insulating layer comprises:
    forming a second metal nanowire layer comprising metal nanowires on the insulating layer; and
    performing a second patterning step to pattern the second metal nanowire layer to form the second touch sensing electrode.

16. The manufacturing method of the touch panel of claim 14, wherein removing the conductive layer located in the display area comprises removing the conductive layer located in the display area by using a first etching solution.

17. The manufacturing method of the touch panel of claim 16, wherein performing the first patterning step comprises simultaneously etching the conductive layer and the first metal nanowire layer with a second etching solution.

18. The manufacturing method of the touch panel of claim 14, wherein the touch panel has a pair of the second peripheral traces, the insulating layer comprises a pair of the conductive vias corresponding to the pair of the second peripheral traces, the second touch sensing electrode is electrically connected to the pair of the second peripheral traces through the pair of the conductive vias and forms a bridge structure on the insulating layer.

19. The manufacturing method of the touch panel of claim 14, further comprising: forming a liquid crystal material layer on a second surface of the substrate, the second surface being opposite to the first surface, wherein forming the liquid crystal material layer comprises coating and printing.

20. The manufacturing method of the touch panel of claim 19, wherein the liquid crystal material layer comprises at least one of a polarized liquid crystal layer or a phase difference liquid crystal layer.

\* \* \* \* \*